US010214923B2

(12) United States Patent
Elduayen Madariaga et al.

(10) Patent No.: US 10,214,923 B2
(45) Date of Patent: Feb. 26, 2019

(54) SEALING PLUG FOR CLOSING HOLES IN WALLS AND THE LIKE

(71) Applicants: 20 EMMA 20 S.L., Aduna (ES); HEGAIN 2100 CONSULTING S.L., Irun (ES)

(72) Inventors: Juan Andrés Elduayen Madariaga, Aduna (ES); Javier Sanchez Garduño, Irun (ES)

(73) Assignees: 20 EMMA 20 S.L., Aduna (ES); HEGAIN 2100 CONSULTING S.L., Irun (ES)

( * ) Notice: Subject to any disclaimer, the term of this patent is extended or adjusted under 35 U.S.C. 154(b) by 0 days.

(21) Appl. No.: 15/621,721

(22) Filed: Jun. 13, 2017

(65) Prior Publication Data
US 2017/0284110 A1 Oct. 5, 2017

Related U.S. Application Data

(63) Continuation of application No. PCT/ES2015/070900, filed on Dec. 14, 2015.

(30) Foreign Application Priority Data

Dec. 16, 2014 (ES) .................................. 201431841

(51) Int. Cl.
*E02D 37/00* (2006.01)
*E04G 17/06* (2006.01)
(Continued)

(52) U.S. Cl.
CPC ........ *E04G 17/0644* (2013.01); *F16B 19/008* (2013.01); *F16B 19/1054* (2013.01);
(Continued)

(58) Field of Classification Search
CPC ... E04G 17/0644; F16L 55/1141; F16L 17/10; F16B 19/1054; F16B 19/008; F16B 2013/006
(Continued)

(56) References Cited

U.S. PATENT DOCUMENTS 1,747,933 A * 2/1930 Goodman ............. F16L 55/132
138/94
2,479,862 A * 8/1949 Payne ................... F16L 55/132
215/359
(Continued)

FOREIGN PATENT DOCUMENTS

DE 102012000547 A1 7/2013
ES 1060376 U 5/2005
(Continued)

OTHER PUBLICATIONS

International Search Report in corresponding PCT Application No. PCT/EP2015/070900, dated Mar. 22, 2016.

*Primary Examiner* — Basil S Katcheves
(74) *Attorney, Agent, or Firm* — Edell, Shapiro & Finnan, LLC

(57) ABSTRACT

According to one embodiment a sealing plug is provided that includes an elastic body and a stem assembled coaxially with respect to one another. The elastic body is suitable for being expanded radially by pulling on the free end of the stem, which projects out of the elastic body, once it is inserted into the hole to be plugged, the elastic body applying a closing pressure against the hole. The sealing plug also comprises an empty space, arranged between the elastic body and the stem, which is communicated with the outside, such that the entrance of fluid into the elastic body is allowed so that the fluid applies pressure against the
(Continued)

elastic body, thereby increasing the closing pressure applied by the elastic body against the hole.

19 Claims, 4 Drawing Sheets

(51) Int. Cl.
    *F16B 19/00*     (2006.01)
    *F16B 19/10*     (2006.01)
    *F16L 55/11*     (2006.01)
    *F16L 17/10*     (2006.01)
    *F16B 13/00*     (2006.01)

(52) U.S. Cl.
    CPC ..... *F16L 55/1141* (2013.01); *F16B 2013/006* (2013.01); *F16L 17/10* (2013.01)

(58) Field of Classification Search
    USPC .......................................................... 52/514
    See application file for complete search history.

(56) References Cited

U.S. PATENT DOCUMENTS

| | | | | |
|---|---|---|---|---|
| 3,667,640 | A * | 6/1972 | Morrow | F16L 55/132 138/89 |
| 4,493,344 | A * | 1/1985 | Mathison | B65D 39/12 138/89 |
| 4,509,243 | A * | 4/1985 | Schneider | F16B 19/1054 138/98 |
| 4,585,033 | A * | 4/1986 | Westman | F16L 55/132 138/89 |
| 4,585,382 | A * | 4/1986 | Bryce, Jr. | F16B 19/10 411/34 |
| 4,760,868 | A * | 8/1988 | Saxon | F16L 55/136 138/89 |
| 4,771,810 | A * | 9/1988 | Ermold | F16L 55/136 138/89 |
| 5,119,861 | A | 6/1992 | Pino | |
| 5,297,691 | A * | 3/1994 | Bottcher | F16L 55/132 138/89 |
| 5,345,734 | A | 9/1994 | Tremblay | |
| 5,819,804 | A * | 10/1998 | Ferrer | F16L 55/132 138/89 |
| 6,138,419 | A * | 10/2000 | Sekiguchi | B21J 15/02 52/235 |
| 6,453,603 | B1 * | 9/2002 | Baker | A01M 1/2011 43/124 |
| 6,564,982 | B1 * | 5/2003 | Woods | B62J 9/001 224/420 |
| 7,954,517 | B1 | 6/2011 | Marinelli | |
| 8,403,007 | B1 * | 3/2013 | Marinelli | F16L 55/168 138/97 |
| 8,418,423 | B1 * | 4/2013 | Potts | E04G 23/0203 52/514 |
| 8,708,000 | B2 * | 4/2014 | Allen | F16L 55/132 138/89 |
| 2009/0025328 | A1 * | 1/2009 | Hemminger | E04G 17/0644 52/514 |

FOREIGN PATENT DOCUMENTS

| | | |
|---|---|---|
| FR | 2825761 A1 | 12/2002 |
| GB | 2151741 A1 | 7/1985 |
| WO | 2008056100 A1 | 5/2008 |
| WO | 2008094647 A1 | 8/2008 |
| WO | 2014202338 A1 | 12/2014 |

* cited by examiner

SEALING PLUG FOR CLOSING HOLES IN WALLS AND THE LIKE

CROSS-REFERENCE TO RELATED APPLICATIONS

The present application relates to and claims the benefit and priority to International Application No. PCT/ES2015/070900, filed Dec. 14, 2015, which claims the benefit and priority to Spanish Patent Application No. P201431841, filed Dec. 16, 2014.

TECHNICAL FIELD

The present invention relates to sealing plugs for closing holes in walls and the like, particularly in walls capable of holding a fluid.

BACKGROUND

Sealing plugs for closing holes in walls comprising an elastic body and a stem, such that by pulling on the stem the elastic body expands radially, are known. Such plugs are widely used for sealing the holes present in concrete walls. As is well known, concrete walls are manufactured allowing a gap between formwork panels which are arranged facing one another. Said panels are secured to one another by means of transverse bolts having threaded ends projecting out of the panels in order to be able to screw on the corresponding nuts. Once the panels are secured, concrete is poured into the gap that is arranged between the formwork panels. To prevent the concrete from adhering to the transverse bolts once it sets, said bolts are usually first covered or placed inside a protective tube (usually made of plastic) which is sometimes removed when the formwork is stripped and other times not. Once the concrete has set, the formwork panels and transverse bolts are disassembled. So once said transverse bolts are disassembled, they generate through holes in the concrete wall that must be closed and sealed, particularly if the wall is intended for holding a fluid, such as water, for example, to prevent water seepage.

In that sense, ES1060376 U discloses a sealing plug comprising an elastic body and a stem assembled coaxially. The elastic body comprises a main cylindrical body and a through hole to allow the passage of the stem. The stem comprises a head which abuts with one end of the main body, whereas a washer having stop functions is arranged at the other end. When the stem is pulled on by the free end with the aid of a riveter or the like, the elastic body is compressed between the head of the stem and the stop washer, causing a radial expansion such that the elastic body fits over the hole of the concrete wall.

SUMMARY OF THE DISCLOSURE

According to one implementation a sealing plug is provided that comprises an elastic body and a stem assembled coaxially with respect to one another. The elastic body is suitable for being expanded radially by pulling on the free end of the stem, which projects out of said elastic body, once it is inserted into the hole to be plugged, said elastic body applying a closing pressure against the hole. The sealing plug also comprises an empty space arranged between the elastic body and the stem and communicated with the outside such that the entrance of fluid into the elastic body is allowed so that said fluid applies pressure against the elastic body, thereby increasing the closing pressure applied by the elastic body against the hole.

The plug improves the sealing of the hole of the wall or the like to be plugged by increasing the closing force that said plug applies on the hole in a simple, economical and reliable manner. When the plug is compressed, it extends radially, applying a closing force against the hole to be plugged, which force the plug is capable of increasing, which is particularly advantageous when the holes to be plugged are arranged in the wall of a dam, for example. In a dam, the pressure that water can apply on the plug can be of an enormous magnitude, so the closing force that the plug applies is high.

These and other advantages and features will become evident in view of the drawings and detailed description.

DETAILED DESCRIPTION

The sealing plug 1 according to one embodiment is suitable for hermetically sealing a hole 4 of a wall 4b which can hold a fluid 4c. In a non-limiting example, said wall 4b is a wall of a dam for water supply or the wall of a water tank, although the wall 4b being able to hold fluids of another type, such as oil, lubricant, etc., is not ruled out.

Figure 1:
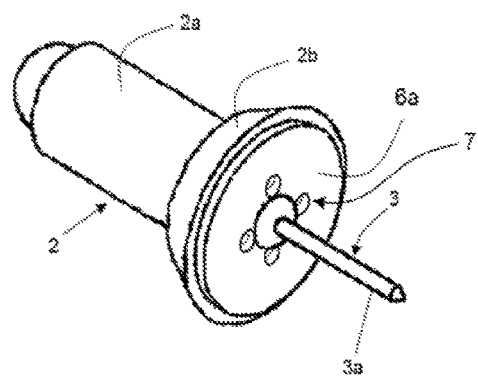
FIG. 1 shows a perspective view of a sealing plug according to one embodiment.
Figure 3:
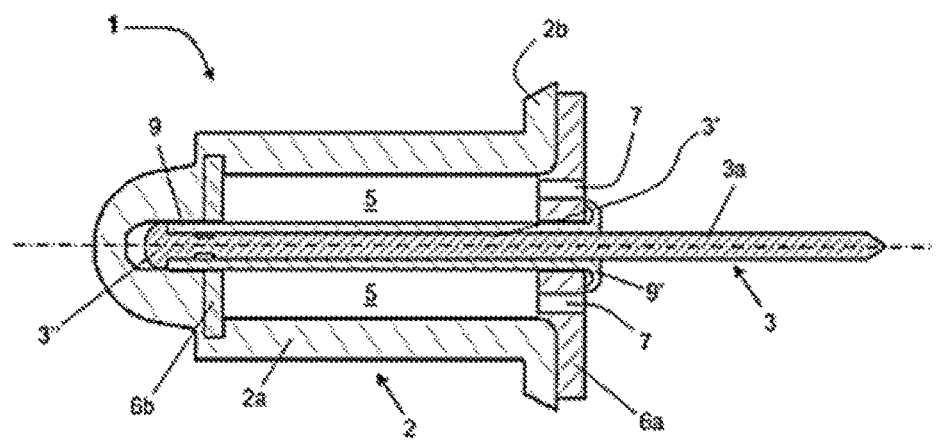
FIG. 3 is a view of section III-III of the sealing plug of FIG. 2.

According to the non-limiting example in the drawings, the plug 1 comprises an elastic body 2 and a stem 3 assembled coaxially with respect to one another as shown in FIG. 1 and in more detail in FIG. 3. The elastic body 2 is suitable for being expanded radially by pulling on the free end 3a of the stem 3, which projects out of said elastic body 2, once it is inserted into the hole 4 to be plugged. When the elastic body 2 expands radially, it applies a closing pressure P1 against the hole 4, closing and sealing said hole 4, obtaining a closing position.

The plug 1 also comprises an empty space 5 which is arranged between the elastic body 2 and the stem 3. Said empty space 5 is communicated with the outside, such that the entrance of fluid, normally water, into the elastic body 2 is allowed so that said fluid applies pressure P2 on the elastic body 2, thereby increasing the closing pressure P1 applied by the elastic body 2 on the hole 4.

If the hole 4 to be plugged is contained in the wall of a dam, for example, it is very important for the closing pressure P1 applied by the elastic body 2 on the hole 4 to be such that it prevents the pressure applied by the water of the dam from being able to overcome said closing pressure P1, in which case the plug would no longer perform its function.

Figure 2:
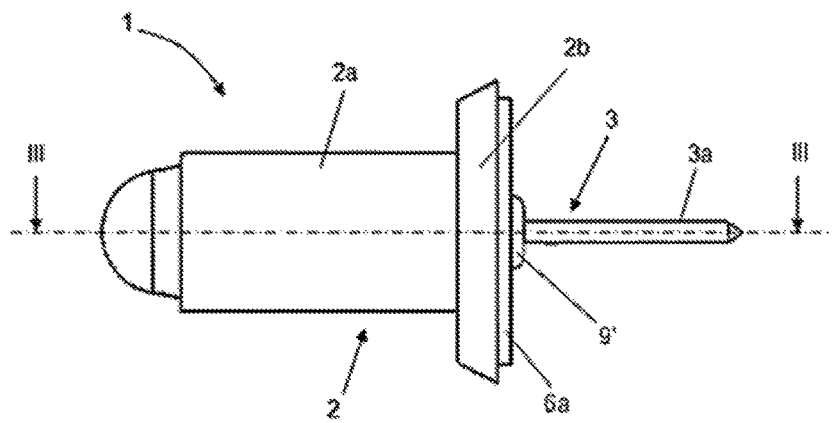
FIG. 2 shows a side view of the sealing plug of FIG. 1.

As seen in FIGS. 1, 2 and 3, one end of the stem 3 is arranged inside the elastic body 2, whereas the opposite end, i.e., the free end 3a, projects from one end of the elastic body 2. Said free end 3a preferably comprises a pointed shape to make insertion into a riveter or similar tool easier.

As seen in FIG. 3, the plug 1 comprises a first stop washer 6a arranged adjacent to the end of the plug 1 through which the free end 3a of the stem 3 projects, and a second stop washer 6b arranged close to the opposite end, such that compression of the plug 1 between said two stop washers 6a and 6b is enabled, as will be described in detail below. Said second stop washer 6b is preferably arranged inside the elastic body 2, as seen in the example of FIG. 3.

The stem 3 of the plug 1 comprises a main rod 3', preferably cylindrical, attached to a head 3" having a larger diameter. The free end 3a which projects out of the elastic body 2 corresponds with the free end of said main rod 3'. The head 3" of the stem 3 is arranged inside the elastic body 2 such that it is disposed ahead of the second stop washer 6b.

The plug 1 also comprises a rivet sleeve 9 preferably having a circular section. The stem 3 is arranged inside said sleeve 9 in a concentric manner and such that the head 3" of the stem 3 is supported on one end of the sleeve 9, specifically on the end of the sleeve 9 that is arranged closest to the second stop washer 6b. At the opposite end, the rivet sleeve 9 comprises a protuberance 9' having a larger diameter which is supported in the first stop washer 6a.

When the stem 3 is pulled on by its free end 3a by means of a riveter or similar tool, the head 3" of the stem 3 applies compression pressure against the rivet sleeve 9 which deforms at least in part because the rivet sleeve 9 is caught between the first stop washer 6a and the head 3" of the stem 3, as seen in FIG. 3. The part of the sleeve 9 arranged between the head 3" of the stem 3 and the second washer 6b is the part that deforms the most, which enables said deformed part of the sleeve 9 to apply compression pressure on the second stop washer 6b. The plug 1 is therefore compressed between the first stop washer 6a and the second stop washer 6b.

When the plug 1 is compressed, radial expansion thereof subsequently occurs. Expansion continues until the stem 3 breaks along a crack, arranged close to the head 3" (as seen in FIG. 3), comprised by the main rod 3' of the stem 3.

The first stop washer 6a, the second stop washer 6b and the rivet sleeve 9 are made of rigid materials, i.e., materials that do not recover their initial shape if they are deformed, therefore, once the stem 3 has broken, the rivet sleeve 9 is what maintains the compressive force required to keep the elastic body 2 deformed.

As a result of the radial expansion of the elastic body 2, said body adapts to and fits against the inner face of the hole 4, by applying radial closing pressure P1 against said hole 1, internally plugging and sealing said hole 4.

The plug 1 reinforces said closing pressure P1 with the pressure that the fluid 4c held by the wall 4b can apply. To that end, the first stop washer 6a comprises at least one passage opening 7 that allows communicating the empty space 5 with the outside, i.e., with the fluid 4c (in the event of the wall 4b holding some type of fluid), such as water, for example, in the case of a dam for water supply or a water tank, pool, etc.

Figure 4:
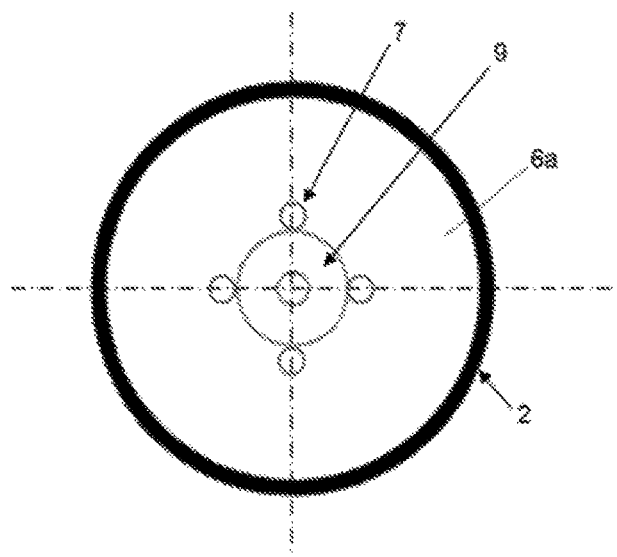
FIG. 4 is a front view of the sealing plug of FIG. 2.

In the non-limiting example of the drawings, the first stop washer 6a comprises four passage openings 7 arranged equidistantly around the center of the first stop washer 6a and at the same radial distance with respect to the center of said first stop washer 6a, as shown in FIG. 4, although the number of openings 7 and the relative position of said openings 7 is not essential for the invention.

As seen in the drawings, the empty space 5 is arranged between the elastic body 2 and the rivet sleeve 9, therefore, the fluid 4c (for example water) that might enter the plug 1 will apply pressure P2 directly against the elastic body 2 on its inner face, thereby increasing the closing pressure P1 applied by the elastic body 2 on the hole 4 due to the radial expansion thereof.

According to one embodiment the elastic body 2 comprises a main body 2a, substantially cylindrical, and as shown in the drawings, it comprises a closed end, that may be bell-shaped, although said shape is not important. The second stop washer 6b is arranged close to said closed end. Said closed end enables sealing of the plug 1 itself, i.e., the fluid 4c entering the elastic body 2 through the passage openings 7 do not cross the plug 1.

When building the wall 4b, for example a concrete wall, in order for said concrete, once it sets, to not adhere to the transverse bolts, which will generate the holes 4 that must be plugged and sealed when they are removed, said bolts are usually covered with a protective tube 8, preferably made of plastic, which is sometimes removed when stripping formwork, and sometimes it is not, as is known by the person skilled in the art.

Figure 8:
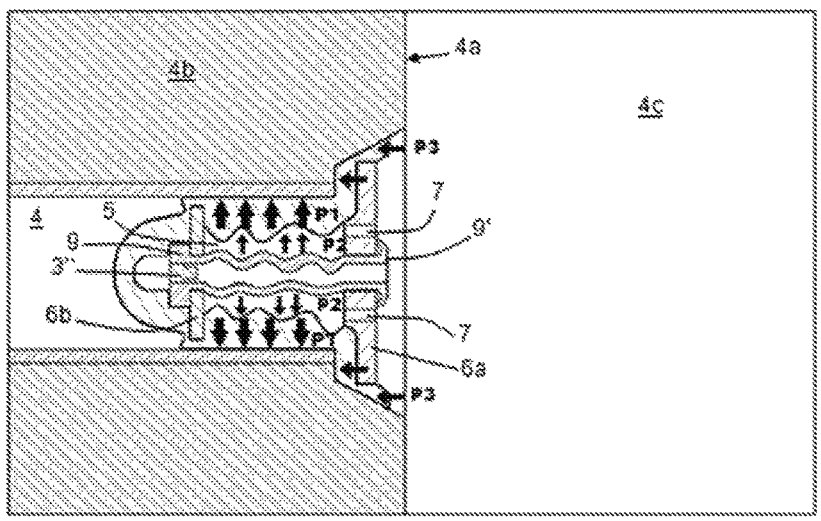
FIG. 8 shows the sealing plug of FIG. 7 in the closing position.

In situations in which said protective tube 8 is not removed from the concrete wall 4b, sealing the inner diameter of the hole 4, i.e., sealing the inner diameter of the protective tube 8 in this case, does not prevent seepage between the outside of the protective tube 8 and the concrete wall 4b. To prevent said seepage, the elastic body 2 of the sealing plug 1 can optionally comprise a head 2b, having a larger diameter, attached to the main body 2a, such that in the closing position said head 2b applies an axial closing pressure P3 against the wall 4b of the hole 4 to be plugged, as seen in FIG. 8. So sealing from the outside is also assured without having to use additional sealing means, such as O-rings, putties, cements or the like, which is very advantageous for sealing holes in the walls of a water supply dam or water tank in a reliable, economical and simple manner because no special skills are required for sealing said hole on the outside.

Figure 5:
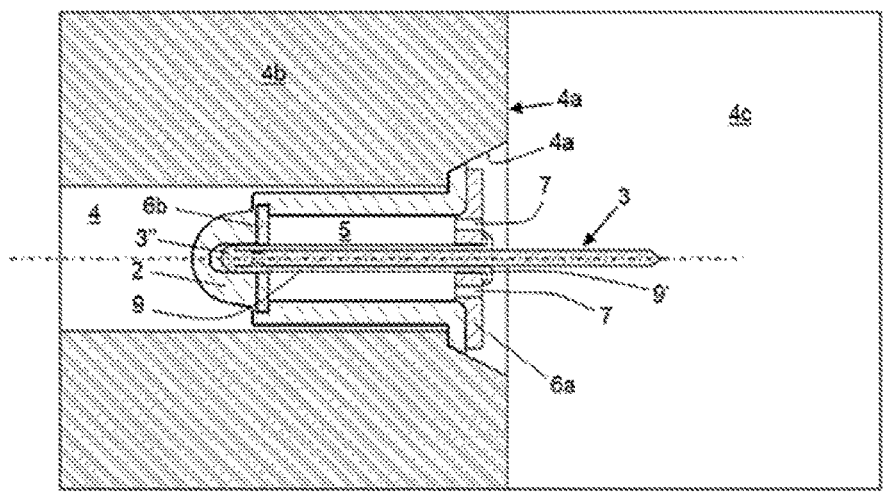
FIG. 5 shows the sealing plug of FIG. 1 inserted and in a closing position in a hole of a wall where the protective tube has been removed.
Figure 6:
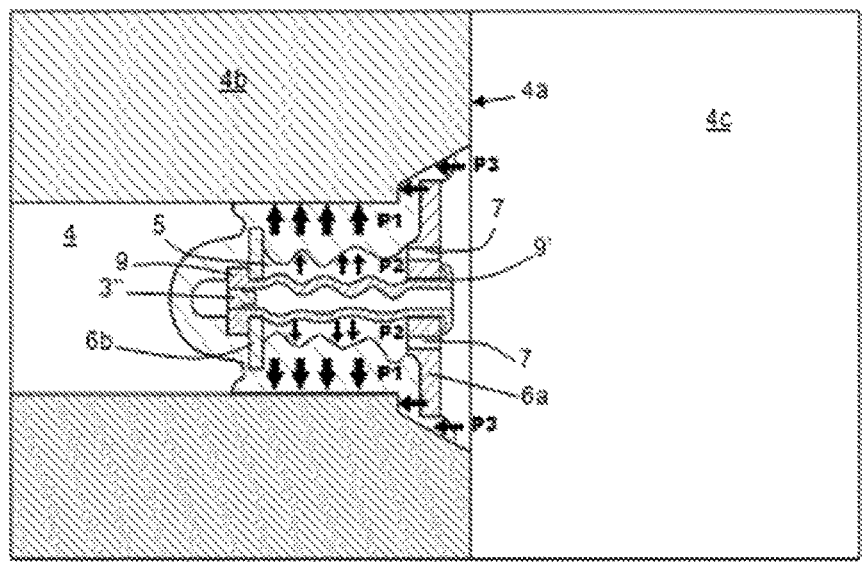
FIG. 6 shows the sealing plug of FIG. 5 in the closing position.

In situations in which the protective tube 8 is removed, or in which said tube 8 does not exist, the head 2b would not be needed to assure hermetic sealing of the hole 4, but the use thereof is advisable because said head 2b abuts with the wall 4b, as seen in FIGS. 5 and 6, preventing the plug 1 from being able to enter too far into the hole 4. Likewise, axial closing pressure P3 on the wall 4b will always improve sealing the hole 4 and preventing any seepage in the longitudinal direction due to a crack that may be present in the wall 4b, for example.

By pulling on the free end 3a of the stem 3, at least part of the head 2b changes geometry in order to adapt to and fit against the shape of the outer contact wall 4a, by applying axial closing pressure P3 on the wall 4b before the stem 3 breaks. If the outer contact wall 4a has irregularities, cracks, etc., they will be sealed with the head 2b, as seen in FIGS. 6 and 8.

According to one embodiment the empty space 5 is substantially cylindrical and extends along the main body 2a and along the head 2b, as shown in FIG. 3. Optionally, in a variant not shown in the drawings, the empty space 5 of the head 2b can be larger, at least in diameter, than the empty space 5 of the main body 2a, which favors fluidity of the head 2b allowing the material to more easily flow and adapt better to the geometry of the outer contact wall 4a. The more the head 2b deforms, the larger the portion of the outer contact wall 4a surrounding the hole 4 to be plugged the plug 1 will cover, therefore the area of the hole 4 to be sealed will increase.

According to one embodiment the main body 2a and the head 2b are formed in a single piece, but both parts can optionally be attached with both parts being independent of one another.

According to some embodiments the stem 3 of the plug 1 of the invention is preferably a rivet.

Figure 7:
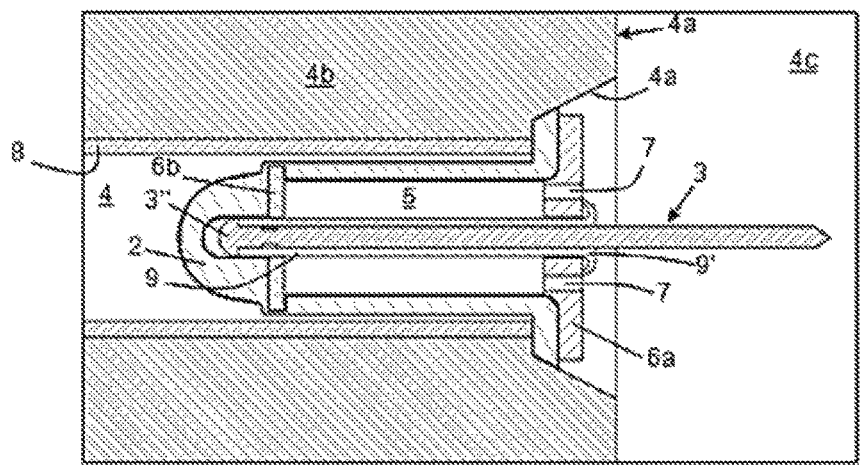
FIG. 7 shows the sealing plug of FIG. 1 inserted and in a closing position in a hole of a wall where the protective tube has not been removed.

To seal the hole 4 of a wall 4b (like the one shown in FIG. 5 or 7), the plug 1 is inserted in said hole 4 such that the main body 2a, and possibly at least part of the head 2b, are arranged inside the hole 4. The plug 1 is suitable for being inserted into the hole 4 and being accessible by means of a single access point, which is advantageous for sealing holes 4 in walls 4b having a considerable thickness.

In turn, since at least part of the head 2b has a diameter that is larger than the main body 2a and larger than the hole 4 to be plugged, is arranged outside said hole 4 such that it abuts against the wall 4b itself, i.e., against the outer contact wall 4a. Since most holes comprise a first cone-shaped part, the head 2b of the elastic element 2 according to some embodiments comprises a shape, preferably cone shape, so that the plug 1 adapts to or is accommodated better both in the hole 4 and in the outer contact wall 4a.

What is claimed is:

1. A plug for closing a hole in a wall that holds a fluid, the wall having an inner surface that defines the hole, the plug comprising:
    an elastic body having a central axis, a first end, a second end, an inner surface and an outer surface, the inner surface defining at least in part an internal cavity; and
    a stem having a first part that resides inside the internal cavity and a second part that resides external to the elastic body protruding from the first end of the elastic body, the first part being operatively coupled to the elastic body so that a pulling on the second part causes the elastic body to axially compress and radially expand to exert a first pressure on the inner surface of the wall that defines the hole when the plug is located inside the hole;
    the first end of the elastic body having a through opening that fluidly communicates the internal cavity with the fluid held by the wall so that when the plug is located inside the hole and the elastic body is radially expanded the fluid applies pressure against the inner surface of the elastic body to cause the pressure applied to the inner surface of the wall that defines the hole to be greater than the first pressure.

2. The plug according to claim 1, further comprising a first stop washer located at or near the first end of the elastic body, and a second stop washer located at or near the second end of the elastic body, each of the first and second stop washers including a passage through which the stem passes, the elastic body being compressible between the first and second stop washers.

3. The plug according to claim 2, wherein the second stop washer is located inside the elastic body.

4. The plug according to claim 2, wherein the first stop washer abuts the first end of the elastic body and has one or more through openings that communicates with the through opening of the elastic body, the one or more through openings being spaced a radial distance away from a center of the first stop washer.

5. The plug according to claim 4, wherein the first stop washer includes a plurality of through openings that are arranged equidistantly around a center of the first stop washer.

6. The plug according to claim 5, wherein the plurality of through opening are arranged at the same radial distance with respect to the center of the first stop washer.

7. The plug according to claim 2, wherein the stem is located inside a rivet sleeve that has a first end and a second end, the rivet sleeve extending through the passage of the first stop washer and the passage of the second stop washer, the stem having a head that is supported on the second end of the rivet sleeve.

8. The plug according to claim 7, wherein the first end of the rivet sleeve includes a protuberance that is supported on the first stop washer.

9. The plug according to claim 7, wherein by pulling on the second part of the stem the head of the stem applies compression pressure against the second end of the rivet sleeve such that at least part of the rivet sleeve deforms, in turn enabling a deformed part of the rivet sleeve to apply compression pressure against the second stop washer.

10. The plug according to claim 7, wherein the internal cavity of the elastic body is arranged between the inner surface of the elastic body and the rivet sleeve.

11. The plug according to claim 7, wherein the first stop washer, the second stop washer, the stem and the rivet sleeve are made of rigid materials.

12. The plug according to claim 7, wherein the stem is a rivet.

13. The plug according to claim 1, wherein the elastic body comprises a main body and a head at the first end of the elastic body, the main body having a first diameter and the head having a second diameter that is larger than the first diameter, the head configured to abut against the wall to apply an axial closing pressure against the wall.

14. The plug according to claim 13, wherein the main body and the head are of a single piece construction.

15. A system comprising:
    a wall that holds a fluid, the wall having a hole defined by an inner surface of the wall,
    a plug for closing the hole in the wall, the plug comprising:
        an elastic body having a central axis, first end, a second end, an inner surface and an outer surface, the inner surface defining at least in part an internal cavity; and
        an elongate stem having a first part that resides inside the internal cavity and a second part that resides external to the elastic body protruding from the first end of the elastic body, the first part being operatively coupled to the elastic body so that a pulling on the second part causes the elastic body to axially compress and radially expand to exert a first pressure on the inner surface of the wall that defines the hole when the plug is located inside the hole;
        the first end of the elastic body having a through opening that communicates the internal cavity with the fluid so that when the plug is located inside the hole and the elastic body is radially expanded the fluid applies pressure against the inner surface of the elastic body to cause the pressure applied to the inner surface of the wall that defines the hole to be greater than the first pressure.

16. The plug according to claim 15, further comprising a first stop washer located at or near the first end of the elastic body, and a second stop washer located at or near the second end of the elastic body, each of the first and second stop washers including a passage through which the stem passes, the elastic body being compressible between the first and second stop washers.

17. The plug according to claim 16, wherein the stem is located inside a rivet sleeve that has a first end and a second end, the rivet sleeve extending through the passage of the first stop washer and through the passage of the second stop washer, the stem having a head that is supported on the second end of the rivet sleeve.

18. The plug according to claim 17, wherein the first end of the rivet sleeve includes a protuberance that is supported on the first stop washer, wherein by pulling on the second part of the stem the head of the stem applies compression pressure against the second end of the rivet sleeve such that at least part of the rivet sleeve deforms, in turn enabling a deformed part of the rivet sleeve to apply compression pressure against the second stop washer.

19. The plug according to claim 15, wherein the elastic body comprises a main body and a head at the first end of the elastic body, the main body having a first diameter and the head having a second diameter that is larger than the first diameter, the head configured to abut against the wall to apply an axial closing pressure against the wall.

* * * * *